United States Patent [19]

Katzman et al.

[11] 4,200,658
[45] Apr. 29, 1980

[54] METHOD FOR MAKING CANDY IN DETAILED DESIGNS

[76] Inventors: Sandra J. Katzman; Ellen F. Katzman, both of 7925 Etiwanda Ave., Reseda, Calif. 91335

[21] Appl. No.: 970,554

[22] Filed: Dec. 18, 1978

[51] Int. Cl.$^2$ ............................................. A23G 3/12
[52] U.S. Cl. .................................. 426/512; 264/226; 426/515; 426/524; 426/660
[58] Field of Search ............... 426/515, 512, 660, 520, 426/524; 264/220, 225, 226, 227

[56] References Cited

U.S. PATENT DOCUMENTS

| | | | |
|---|---|---|---|
| 1,865,097 | 6/1932 | Gilham | 426/515 X |
| 3,384,003 | 5/1968 | Sollich | 426/520 X |
| 3,545,981 | 12/1970 | Klein et al. | 426/515 |
| 3,638,553 | 2/1972 | Kreutner | 426/520 X |
| 3,739,051 | 6/1973 | Smith | 264/225 X |

FOREIGN PATENT DOCUMENTS

| | | | |
|---|---|---|---|
| 2287166 | 5/1976 | France | 426/512 |
| 38-12718 | of 1963 | Japan | 426/515 |

*Primary Examiner*—Robert L. Lindsay, Jr.
*Attorney, Agent, or Firm*—Romney, Schaap, Golant, Disner & Ahsen

[57] ABSTRACT

An inexpensive method and system for making chocolate candy having fine detailed designs. The method comprises creation of relatively inexpensive silicone molds and the use of these molds for making chocolate candy in detailed designs while allowing production of only small or moderate quantities at reasonable cost. The system includes a two-sectioned vat, a cooling tunnel and a belt for carrying the molds through the tunnel.

10 Claims, 3 Drawing Figures

METHOD FOR MAKING CANDY IN DETAILED DESIGNS

BACKGROUND OF THE INVENTION

1. Field of the Invention

The present invention relates to a method and a system for making candy, and, more particularly, to a method and a system for making complex designs in chocolate or similar candy in moderate quantities and at relatively low cost. In addition to some unique processing steps for insuring high quality candy, the use of silicone material for making the molds allows the producer to create complex shapes and detailed designs without resorting to high cost, metal molds.

2. Description of the Prior Art

Candy, especially chocolate and pastels and/or chocolate compound varieties, have been made for years in generally one of two ways: firstly, when high production is required, high cost, intricately designed metal molds have been used since the large quantities of candy produced allowed full amortization of the molds; secondly, where low to intermediate levels of production are required, low cost, relatively simple design molds have had to be used to keep the cost/price of the candy within reasonable bounds. In the latter case, intricate forms in the candy have not been found to be physically possible nor commercially viable, and hence, creativity in end product design has been limited. In both cases, the raw material needed to produce the candy has not been expensive, but the total processing cost of unique and fine designs has been found to be fairly expensive, due mostly to the molds unless, production was very high such as with candy bars, or similar large volume products. Thus, the full potential of candy design, including that made of chocolate and pastels and/or chocolate compounds has been inhibited.

SUMMARY OF THE INVENTION

The above-mentioned problems in the prior art are overcome by the present invention which provides a method and a system for molding confectionery material. The method comprises steps of providing a plate having an upper surface to form a design to be duplicated with confectionery material and having a generally flat lower surface; providing a sheet to accommodate several rows of plates; connecting a plurality of plates to the sheet; providing frames to create a border for each row of the plates on the sheet; providing a room temperature vulcanizing silicone rubber material and curing agent; mixing the silicone rubber material and the curing agent together to form viscous mass; brushing a thin coating of the viscous mass on each of the plate's upper surface; pouring more of the viscous mass onto the plates and onto the sheet so as to cover the bordered areas to the top of the frames; curing the viscous mass at room temperature to form a mold; further curing the mold on the sheet at an elevated temperature; cooling the mold sufficiently to allow a normal handling without the use of gloves; separating the mold from the plates; additionally curing the mold at an elevated temperature; again cooling the mold to approximately room temperature; heating the confectionery material until it is liquid and pourable; lightly brushing a thin coating of the confectionery material on the interior surface of the mold; filling the mold cavity with confectionery material; cooling the filled mold for a period of time depending upon the type and dimension of the confectionery material to harden the material; and removing the material from the mold.

The system comprises a thermal electric vat having two vertically displaced sections, the two sections being in communication through a valve and each section having an agitator contained therein wherein the vat properly heats, cools and agitates raw chocolate; molds for forming the chocolate, means connected to the thermal electric vat for communicating the melted chocolate to the molds; means for transporting the molds; a cooling tunnel for receiving the molds on the transporting means and for reducing the temperature of the chocolate in the molds to approximately 56° F.

An object of the present invention is to provide a method and a system for making low cost molds capable of producing fine, detailed and complex designs in candy at reasonable cost.

Another aim of the present invention is to provide a method and a system for making candy which, as a finished product, is of the same high quality as that from large volume producers who use expensive molds and processing equipment.

Yet another object of the present invention is to provide a method and a system for making fine, detailed and complex designs in chocolate candy of consistent form and taste in small or moderate quantities and saleable at moderate price.

Still another aspect of the present invention is to provide a method and a system for making complex designs in pastels and/or chocolate compound candy of high quality in small or moderate quantities and saleable at moderate prices.

A further aim of the present invention is to provide a method for making molds for the production of candy having a complex design, said molds being made in a short amount of time.

A still further object of the present invention is to provide a method and a system for allowing candy to be used as an art form with the reproduction in candy of very detailed and fine designs at viable commercial prices.

The foregoing objects, advantages, features and results of the present invention together with various other objects, advantages, features and results thereof which will be evident to those skilled in the art in light of this disclosure may be achieved with the exemplary embodiments of the invention described in detail hereinafter and illustrated in the accompanying drawing.

DESCRIPTION OF THE PREFERRED METHOD AND SYSTEM

Figure 1:
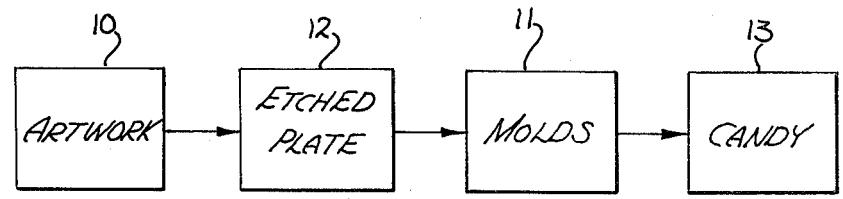
FIG. 1 is a block diagram illustrating the basic process steps for making candy having detailed designs.

While the present invention is susceptible of various modifications and alternative constructions, an embodiment of the method and the system are shown in the drawings and will herein be described in detail. It should be understood however that it is not the intention to limit the invention to the particular forms disclosed; but on the contrary the intention is to cover all modifications, equivalences and alternative constructions falling with the spirit and scope of the invention as expressed in the appended claims.

While the present invention is contemplated for confectionery material the present disclosure will focus on chocolate, pastel and chocolate compound which when processed will be referred to as candy.

METHOD

Figure 2:
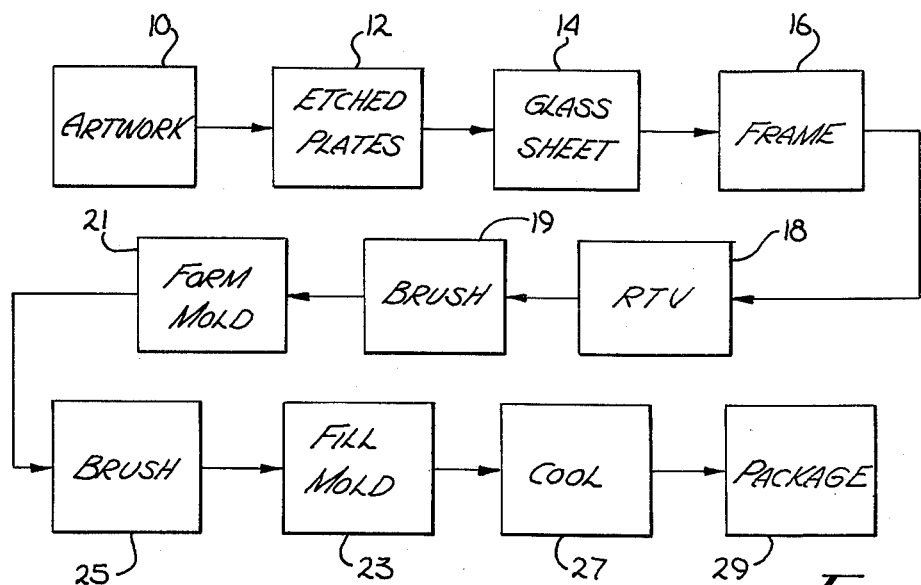
FIG. 2 is a block diagram illustrating the RTV mold production steps.

It is a primary objective and a major advantage of the inventive method to make chocolate candy having fine, detailed and complex designs, inexpensively, at low levels of candy production. Referring to FIGS. 1 and 2 the method begins by providing camera ready artwork 10 describing the design to be made in candy in two-dimensional detail. It should be noted that a three-dimensional item can also be handled with but minor deviations, which will be described below.

The artwork is initially used to create a black and white line negative. Then, the image is superimposed or transferred to a metal sheet such as eleven-point magnesium using actinic lights. The metal is then predeveloped in a chemical tank and subsequently immersed in an acid bath where the acid etches the non-image areas to achieve a three-dimensional, right reading, positive effect on the metal. Lastly, the metal sheet is sawed or machined to size to obtain an etched plate 12.

In order to develop good molds and smooth surfaces on the chocolate candies, very smooth plates must be made. Therefore, all plate surfaces are cleaned of all blemishes, even those which are usually tolerable in the printing of newspapers, magazines, business cards and the like; this often necessitates the making of extra plates and controlling the etching step more precisely to insure the availability of the minimum number of plates desired. There is also a need to perform extra wash and neutralizing steps and a need to mechanically smooth all plate edges.

The next series of steps involves fabrication of the molds 11, FIG. 1. Generally, a heat resistant glass sheet 14 is selected and upon which are arranged up to several rows of five or six etched plates each, each row being spaced about two to three inches apart, and each individual plate being spaced at least one-quarter inches apart. Frames 16, FIG. 2, are then used to create borders around each row of plates, the frames being secured to the glass sheet using household glue or tape. The glue should cover the entire lower surface of the plate so that mold material will not later seep in between the plates and the sheet.

A major advantage of the method is the use of room temperature vulcanizing silicone rubber 18 for making flexible molds. An example of such a silicone rubber is General Electric RTV 630. RTV 630 involves both 630A, a silicone rubber material, and 630R, a curing agent, mixed in a 10 to 1 ratio, respectively. RTV 630 is a room temperature vulcanizing material and is permitted under Food Additive Regulation 121.2514 of the FDA for food contact use. Further, RTV 630 produces molds at less than one-third the cost of metal molds and in less than one-tenth the time of metal molds.

The mold forming process 21 itself involves the above-noted mixing step to form a viscous mass followed by an initial brushing 19 of a thin coating of the mixture on the exposed top surface of the individual etched plates using a stiff art brush. Then, more of the silicone rubber in its viscous form is poured onto the plates to completely fill the volume formed by the frames surrounding the rows of etched plates. Generally, it has been customary prior to the pouring step just noted to allow the viscous mass to deaerate for 15–20 minutes using vacuum equipment, in order to minimize the formation of bubbles. However, in this improved and lower cost procedure, the pause step before pouring is used only to check for proper flow of silicone rubber material without the deaerating step. This modification to the normal procedure for working with RTV material has been found to provide about a 1½% mold shrinkage, due to not deaerating, which allows for a more proper fit with few, if any, inadequate molds.

The molds are then cured in two states: first, curing is effected for at least 5 hours at room temperature followed by a further cure for about 30 minutes at 300° F. When the molds have cooled to about room temperature, they are removed from the glass sheet, separated from the plates and trimmed using a knife or similar cutting tool. Thereafter, they are post-cured at 300° F. for 15 minutes and then cooled again to room temperature. A final step in the making of the silicone rubber mold involves having it washed in hot water with a mild detergent.

The mold thus created can be essentially two-dimensional or flat, or can even be detailed three-dimensional. If a three dimensional model was supplied initially instead of a two-dimensional etched plate, the only provision necessary to proceed with the RTV mold making, as described above, is that the three-dimensional model be capable of sustaining temperature up to 350° F. for the various time periods required. The mold that is created is quite detailed and fine and is comparable in design complexity to molds made from high cost metal. Further attributes of the RTV molds, which clearly contribute to an efficient, low cost production process for chocolate candy include: (a) a fast basis curing time of only 30 minutes at 300° F.; (b) reversion resistance or excellent mold stability up to 5000 psi and up to 350° F.; (c) high tear characteristics, as noted above, which allow extended production life, especially for intermediate production runs; (d) production economy achieved via RTV 630 high material strength which means less silicone is required for making flexible molds; and (e) a shelf life in excess of six months.

Having described the creation of dies for use in making molds, and the mold-making process, the third process, that of making the chocolate candy 13, FIG. 1 will be described. Raw chocolate, as made by a few large manufacturers, usually in large slabs, must be broken into smaller pieces and inserted in a vat 20, FIG. 3, for melting. Then, the chocolate pieces are heated to about 100°–105° F., a range wherein the chocolate pieces melt and become liquid. (Pastels and chocolate compound are heated to about 115° F.) After the chocolate becomes a liquid, it is allowed to cool. During cooling, very small pieces or shavings of chocolate are inserted or seeded into the vat to temper the chocolate batch. It should be noted that pastels are only slightly tempered, and chocolate compound material are usually not tempered, unless very long product shelf life is intended. However, lack of proper tempering in pure chocolate will allow the cocoa butter, mixed within, to rise to the surface of the chocolate causing discoloration.

To further avoid undoing of the seeding/tempering process, agitators are initially used during the melting step to preclude crust formation on the side of the vat. Thus, the melted chocolate is cooled first to about 91° F. (within the range 90°–95° F.) and then again to 82° F. (within the range 81°–83° F.) before being reheated to about 90° F. (within the range 86°–93° F.). Gentle agitation is continued during these latter steps. Next, the chocolate is pumped 30, FIG. 3, or gravity fed to fill 23, FIG. 2, each of the previously made molds after first brushing 25 the inside mold surfaces with chocolate material using a soft art brush. Any excess chocolate material is scraped from the top of the molds using a spatula or similar tool.

Figure 3:
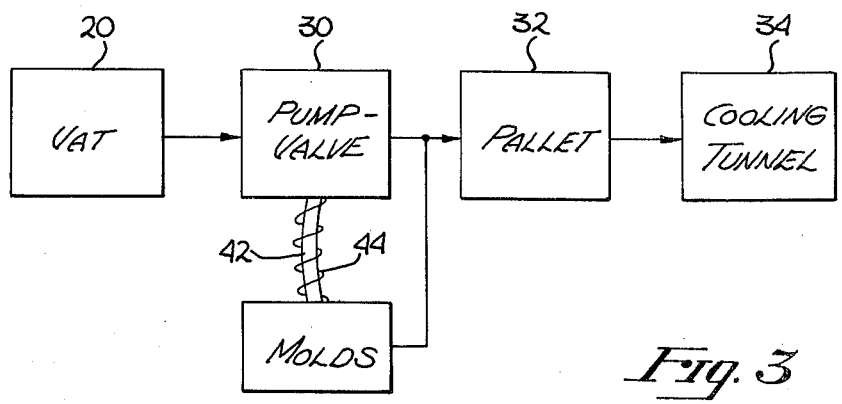
FIG. 3 is a block diagram illustrating the handling of chocolate candy and the system for forming candy.

Cooling 27 of the chocolate in the molds involves a complicated sub-process in which the molds are first set on some means for transportation, such as pallets 32, FIG. 3, which in turn are set on a movable belt and moved through an electric cooling tunnel 34 whose temperature is set at about 56° F., a level needed to properly "set" the chocolate. The cooling tunnel has air baffles not only to insure an even air flow around the molds, but to prevent severe air movements against the chocolate which would cause loss of proper temper in the chocolate. An approximately 18–19 minute period is required for passing through the tunnel. The last step in this process requires bringing the pallet out into the open air. At this point, the molds are flexed, allowing removal of the chocolate candy, wherein any rough edges can be trimmed prior to packaging 29, FIG. 2. Experience has disclosed that especially large chocolate pieces, because of their size and thickness, may require additional periods of cooling by re-running through the tunnel; pastels and compounds may be placed in a freezer at about 0° F. for two minutes to two hours as a function of the mass or size of the piece.

The result of the above method is the creation of detailed, complex designs in chocolate, suitable for duplicating logos, trade name, trademarks, graphic or commercial art forms and even games such as Parker Brothers' Monopoly game board, money, cards and playing pieces. These chocolate designed products are not only attractive, but economical in small or moderate production quantities, a feat previously reserved only for high production items.

SYSTEM

Whereas the description of the Method covers the various processes and their detailed steps, all leading to the creation of chocolate candy, in fine, detailed designs, the invention herein also includes a system which is suitable for efficient production of small and moderate quantities of chocolate candies.

The thermal-electric melting vat 20 is comprised of two vertically disposed sections, an upper section having an open top and a lower, covered section, the two sections being spaced a short distance from one another but connected through a valve. Both sections have agitators, temperature guages and timing indicators (none of which is shown) for proper control of each step of the chocolate melting and seeding process. Additional controls are attached to the vats for alternatively controlling the heating and cooling cycles in a manual or automatic manner. Duplicate controls allow the two sections to be used simultaneously to reduce flow-through time, if necessary. A pump-valve arrangement 30 is attached to the lower section, although two of such pump-valve arrangements could be used, one attached to each section. The pump is connected to a hose 42 which is wrapped in a heating coil 44 to preclude premature solidification of the chocolate. The hose is used to fill the molds which are set on a pallet 32 prior to their insertion into a cooling tunnel 34.

A soft art brush and a spatula are used to preliminarily coat the molds with melted chocolate and wipe off any excess chocolate above the top of the mold, respectively.

The filled molds, as placed on a pallet, are quickly placed on a movable forty-five foot belt apparatus. The belt exceeds the cooling tunnel length by at least four feet at each end of the tunnel. The tunnel is set to an average temperature of about 56° F., with all sections of the tunnel adjusted to remain in the range of 55° to 57° F. To accomplish this, the tunnel includes temperature controls and baffles for control of air movement.

If the chocolate molds are relatively small and thin sectioned, the chocolate should set properly toward the end of the cooling tunnel in which case it may be brought out onto a table, released, trimmed, if necessary, and packaged for shipment 29, FIG. 2. If the chocolate mold is large and relatively thick sectioned, however, proper setting may not be achieved during a first run through the cooling tunnels, and a second run may be required.

The above system works exceedingly well for making chocolate, pastels or chocolate compound materials in very fine, detailed designs, and at a moderate cost so that relatively small or medium quantities of production can be commercially handled.

What is claimed is:

1. A method for molding confectionery material comprising the steps of:
    (a) providing a plate having an upper surface to form a design to be duplicated with confectionery material and having a generally flat lower surface;
    (b) providing a sheet to accomodate one or more of said plates;
    (c) connecting one or more of said plates to said sheet;
    (d) providing a frame to create a border for said plate on said sheet;
    (e) providing a room temperature vulcanizing silicone rubber material and curing agent;
    (f) mixing said silicone rubber material and said curing agent together to form a viscous mass;
    (g) brushing a thin coating of said viscous mass on said plate's upper surface;
    (h) pouring more of said viscous mass onto the plate and onto said sheet so as to cover the bordered areas to the top of said frame;
    (i) curing said viscous mass at room temperature to form a mold;
    (j) further curing said mold on said sheet at an elevated temperature;
    (k) cooling said mold sufficiently to allow normal handling without use of gloves;
    (l) separating said mold from said plate;
    (m) heating said confectionery material until it is liquid and pourable;
    (n) lightly brushing a thin coating of said confectionery material on the interior surface of said mold;
    (o) filling the mold cavity with confectionery material;
    (p) cooling said filled mold for a period of time depending upon the type and dimension of said confectionery material to harden said material; and
    (q) removing said material from said mold.

2. A method for molding confectionery material as claimed in claim 1 wherein connecting said plate to said sheet comprises the steps of covering the entire lower surface of said plate with a food compatible glue; and when more than one plate is present, adhering said plates to said sheet in rows where each of said rows are spaced apart and where each of said plates is at least ⅛ inches apart; and wherein:
  said plates are photo-chemically etched; and
  said sheet is heat resistant glass.

3. A method for molding confectionery material as claimed in claim 1, including the step of adhering said frame to a glass sheet around said plate using a glue or tape.

4. A method for molding confectionery material as claimed in claim 1 wherein said first mentioned brushing step includes using a stiff art brush.

5. A method for molding confectionery material as claimed in claim 1, including the step of pausing for approximately 15 minutes prior to said pouring step.

6. A method for molding confectionery material as claimed in claim 1 wherein said second mentioned brushing step includes using a soft art brush.

7. A method for molding as claimed in claim 1 wherein:
  curing said viscous mass for at least 5 hours at room temperature to form a mold; and
  further curing said mold on said sheet for approximately 30 minutes at approximately 300° F.

8. A method as claimed in claim 1 including proceeding with said pouring step without a prior deaerating step.

9. A method as claimed in claim 1 wherein heating said confectionery material to about 115° F.; and
  cooling said material by placing said material in a freezer at about 0° F. from two minutes to two hours depending upon size.

10. A method as claimed in claim 1 wherein:
  heating said confectionery material to about 100°–105° F., then cooling said material in discrete steps first to 90°–95° F., and then to 81°–83° F., and then reheating said confectionery material to about 86°–93° F.;
  tempering said batch of confectionery material with small amounts of added material prior to said above cooling; and
  cooling said material in said mold for about 18 to 19 minutes, at a temperature of about 56° F.

* * * * *